United States Patent [19]

Gunderson, III

[11] Patent Number: 5,102,261
[45] Date of Patent: Apr. 7, 1992

[54] FLOATING CONTAINMENT BOOM

[75] Inventor: William F. Gunderson, III, Anchorage, Ak.

[73] Assignee: Peratrovich, Nottingham & Drage, Inc., Anchorage, Ak.

[21] Appl. No.: 472,568

[22] Filed: Jan. 16, 1990

[51] Int. Cl.$^5$ ............................................. E02B 15/04
[52] U.S. Cl. ........................................ 405/70; 405/63; 405/72
[58] Field of Search .................... 405/63–72; 210/242.3, 242.4, 923

[56] References Cited

U.S. PATENT DOCUMENTS

| | | |
|---|---|---|
| 1,397,891 | 11/1921 | Jones . |
| 2,240,567 | 5/1941 | Meacham et al. . |
| 2,677,934 | 5/1954 | Breunesse . |
| 3,499,291 | 3/1970 | Mikkelsen ........................ 405/70 X |
| 3,579,994 | 5/1971 | Preus et al. . |
| 3,592,006 | 7/1971 | Crucet ..................................... 405/66 |
| 3,640,073 | 2/1972 | Samsel . |
| 3,667,235 | 6/1972 | Preus et al. ................... 210/242.4 X |
| 3,708,982 | 1/1973 | Blockwick . |
| 3,710,577 | 1/1973 | Matheson . |
| 3,740,955 | 6/1973 | Fossberg . |
| 3,744,254 | 7/1973 | Fennelly ...................... 210/242.3 X |
| 3,757,526 | 9/1973 | Larsson . |
| 3,779,020 | 12/1973 | Muramatsu et al. . |
| 3,792,589 | 2/1974 | Sayles . |
| 3,798,911 | 3/1974 | Oberg . |
| 3,802,201 | 4/1974 | Hoult et al. . |
| 3,835,651 | 9/1974 | Butterworth et al. . |
| 3,839,869 | 10/1974 | Green . |
| 3,849,989 | 11/1974 | Preus . |
| 3,922,861 | 12/1975 | Grihangne . |
| 3,984,987 | 10/1970 | Light, Jr. . |
| 4,006,082 | 2/1977 | Irons ..................................... 210/83 |
| 4,089,179 | 5/1978 | Trautman . |
| 4,124,981 | 11/1978 | Preus ................................. 405/70 X |
| 4,174,185 | 11/1979 | Toki . |
| 4,252,461 | 2/1981 | Colamussi et al. ................. 405/115 |
| 4,272,214 | 6/1981 | Nyfeldt et al. ......................... 405/72 |
| 4,425,053 | 1/1984 | Muto ..................................... 405/63 |
| 4,484,836 | 11/1984 | Bailard ................................. 405/74 |
| 4,534,675 | 8/1985 | Morrisroe ........................... 405/24 |
| 4,537,528 | 8/1985 | Simpson ............................... 405/72 |
| 4,543,012 | 9/1985 | Riley ..................................... 405/71 |
| 4,688,024 | 8/1987 | Gadde ............................... 405/63 X |
| 4,692,059 | 9/1987 | Juutilainen ........................... 405/63 |
| 4,738,563 | 4/1988 | Clark ............................... 405/63 X |

FOREIGN PATENT DOCUMENTS 1529754 6/1968 France ................................. 405/63

Primary Examiner—Dennis L. Taylor
Assistant Examiner—John A. Ricci
Attorney, Agent, or Firm—Seed and Berry

[57] ABSTRACT

A floating containment boom for containment and isolation of waterborne pollutants, such as oil, silt, medical waste, bacteria, debris, and suspended particulates. The containment boom is comprised of a floatation unit, a ballast, a continuous curtain of at least one sheet of a flexible geosynthetic fabric, and at least two tow cords. The curtain has an upper sleeve containing the flotation unit and may have a lower sleeve containing the ballast. The geosynthetic fabric is water-pervious and may be oil-absorbing. The fabric allows water to pass through while containing the waterborne pollutants. The boom of the invention may also be used as a seining device, to define a swim area, and as a littoral flow trap.

2 Claims, 3 Drawing Sheets

FLOATING CONTAINMENT BOOM

TECHNICAL FIELD

The invention relates to a floating boom for containment of oil spills, silt, debris, medical waste, bacteria, and other contaminants and pollutants on the surface of, or suspended in, a body of water.

BACKGROUND OF THE INVENTION

Spills and releases of oil and other materials are a common occurrence in waterways. Such releases can occur at transfer stations or may result from major damage to the hull of a ship or tanker. Other sources of contaminants, such as silt, debris, and other pollutants or suspended particulates, include dredging operations, construction projects at or near bodies of water, industrial releases into waterways from manufacturing and processing facilities, and natural events, i.e., floods, storms, mud slides, and the like.

Medical waste including bacteria and debris, such as used syringes, is another source of water contamination that has recently become of concern. When washed ashore or into a body of water that is used for drinking water or simply for recreation, such waste directly impacts water quality and presents a health risk from bacterial infection. Human and animal waste present similar health risks if allowed to enter into a body of water or other waterway.

The environmental and health consequences of spills and releases of water-borne pollutants are potentially grave; however, they can be mitigated or abated through timely containment and cleanup.

Floating barrier or containment boom systems have been devised to isolate aquatic spills. Typically, they employ a series of buoyant boom sections that have segments of curtains or skirts attached thereto. The curtains are typically made of water-impervious, non-oil-absorbent, flexible sheet material. The curtains extend downward into the water below the boom section and are usually stabilized by at least a weighted ballast integrated into the lower edge of the curtain.

The variations upon this basic concept employ various, sometimes elaborate, mechanical means for securing boom sections to curtain segments and for interconnecting boom curtain sections to form a continuous containment system. Such booms may be provided in small sections and require extensive subassembly prior to deployment, which represents an increase in labor requirements as well as an increase in deployment time. These increases represent an increased cost and delay in containment time that amplifies the potential environmental impact, particularly for major spill events having large containment areas.

Some containment systems employ a series of cables, wires, and other structural supports to provide rigidity and/or stability to the curtain segments and the system as a whole. Due to the rigidity, some prior art booms are susceptible to the movement of contaminants beneath the boom curtain. When exposed to wind-generated currents, tidal currents, or wave conditions, such booms have been known to break under the load, have been overtopped by waves, or have had oil propelled over and under the boom. Inadequate curtain length also contributes to the passage of contaminants beneath the containment system.

The materials used in conventional containment systems may be sensitive to certain environmental conditions (e.g., salt water and ultraviolet light) and thus too quickly deteriorate. For instance, metal parts may rust and corrode. Further, curtain fabrics may lose flexibility or crack at low temperatures, or may deteriorate due to prolonged exposure to ultraviolet light.

It is therefore desirable to provide a boom containment system that is inert to environmental conditions that can cause deterioration of boom materials and components, and that can be manufactured in continuous sheets to minimize the labor requirement and number of field connections required at the time of deployment. The containment system should be flexible, structurally sound, and capable of withstanding severe wind, wave, current, and tidal fluctuations. It should maintain freeboard in wave conditions, be easy to deploy, and meet site-specific and depth requirements. The containment system should also retain its flexibility at low temperatures. The present invention possesses these and additional qualities.

SUMMARY OF THE INVENTION

The present invention is directed to a floating containment boom that is comprised of a flotation unit, a ballast, a continuous curtain of at least one sheet of a flexible, geosynthetic fabric, and optionally, at least two tow cords.

As used herein, the term "geosynthetic fabric" includes geotextiles, engineering fabrics, and filter fabrics and is defined to mean a water-pervious sheet of plastic fibers, filaments, or yarns that have been formed into a stable network such that the fibers, filaments, or yarns retain their relative position to each other. The geosynthetic fabric may be a woven product or a nonwoven, random construction of fibers.

The invention can be used to include or contain waterborne pollutants, e.g., an oil spill, or to exclude waterborne pollutants, e.g., to exclude pollutants from a defined swimming area.

In a first embodiment, the boom of the invention comprises a flotation unit, a ballast, and a continuous curtain of at least one sheet of a flexible geosynthetic fabric having a lengthwise extending first upper sleeve surrounding the flotation unit, a lengthwise extending second lower sleeve surrounding the ballast, and a main sheet portion extending between the first and second sleeves with a substantially vertical orientation. Optionally, there may be at least two lengthwise extending tow cords secured to the main sheet portion. The sheet has an upper edge portion folded along a lengthwise fold line and secured to the main sheet portion to form the second sleeve.

In a second embodiment, the boom of the invention comprises a flotation unit, a ballast, a continuous curtain of at least one sheet of a flexible geosynthetic fabric having a lengthwise extending upper sleeve surrounding the flotation unit, a main sheet portion extending vertically downward from the upper sleeve, and, optionally, at least two lengthwise extending tow cords secured to the main sheet portion. The sheet has an upper edge portion folded along a lengthwise fold line and secured to the main sheet portion to form the upper sleeve and a lower edge portion. If tow cords are present, a first tow cord may be secured to the main sheet portion below the sleeve, and a second tow cord may be secured to the main sheet portion above the lower edge portion. The ballast is attached to the lower edge portion by a connecting means.

The boom of the invention may be assembled by first taking a sheet of geosynthetic fabric having an upper edge and a lower edge, folding the upper edge lengthwise, securing the edge to the main sheet portion to form a first sleeve, and cutting slits at regular intervals along the first sleeve for insertion of the flotation units. Next, the lower edge is folded lengthwise around the ballast and secured to the main sheet portion. Tow cords are then positioned on the main sheet portion. The flotation unit is typically inserted prior to deployment. Subassembly is preferably done prior to deployment; however, the boom of the invention is capable of complete assembly on-site.

A boom according to the second embodiment of the invention may be assembled much as described above, except the second sleeve need not be formed. Instead, the ballast may simply be attached (e.g., wire tied) to the lower tow cord.

The containment boom may be held in place by an anchor or series of anchors attached at or near the second sleeve or to the ballast.

The upper and lower edges can be easily secured to the main sheet portion, for instance, by sewing or heat fusion. Booms according to the present invention can be manufactured to any desired length by securing sheets of geosynthetic fabric together. The manufacture of booms of the invention require the least possible number of in-the-field seam connections.

The boom is relatively simple to assemble, providing fewer failure points, faster deployment, less on-site equipment, lower on-site labor requirements, and safer assembly conditions. Other advantages of the invention include flexibility, durability, ease of storage in conventional crates or on reels, and ease of deployment.

Booms according to the invention can be used to contain oil spills, suspended particulates, and other lighter-than-water releases. They may also be used to contain silt, debris, and other materials from dredging, demolition, or construction operations. Further, they may be used to protect water intake structures and the like.

The boom of the invention may be used as a beach seine device, collecting waterborne contaminants and debris as the boom is towed through a body of water. It may also be used as a bathing beach pollution and debris barrier screen to define a swim area.

The boom can also be used as a littoral flow trap or basin to prevent erosion of beaches and river banks. Littoral flow is the flow of water that is responsible for eroding beaches and shorelines and that carries away small particles of soil or silt suspended in the water.

The boom of the invention can be deployed throughout the full water column, i.e., from the surface to the floor of a body of water. The flotation unit may be on the water surface or submerged, with a curtain extending down through the water toward the floor. For example, the boom may be submerged to allow movement of vessel traffic or ice. With properly installed ballasts and anchors, the boom can remain stationary under moving ice, thereby acting to stop pollutants from migrating from the water surface downward to the sea floor and then beyond the containment area.

The boom of the invention is particularly effective for isolation of beaches and shorelines because the flexible nature of the curtain allows the curtain to conform to the shape of the shoreline both at and below the water surface. This forms a tight seal, preventing the movement of contaminated water beneath the curtain.

The boom system can be deployed from a barge, a dock with a small boat, or other surface or access point near the water. The invention is uncomplicated in design and can be easily deployed by persons having basic waterfront experience without prior training in containment boom deployment.

DETAILED DESCRIPTION OF THE INVENTION

Figure 1:
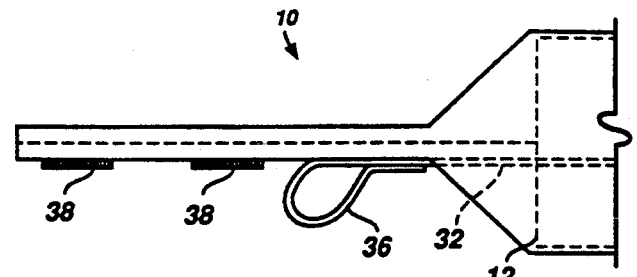
FIG. 1 is a fragmentary, top plan view of a boom according to the present invention.

As shown in the drawings for purposes of illustration, the invention is embodied in a containment boom indicated generally by reference numeral 10. The containment boom 10 includes a flotation unit 12 and a curtain 14. The curtain 14 has an upper first sleeve 16 and a lower second sleeve 18, with a main sheet portion 20 extending therebetween. The curtain 14 is formed from a sheet of geosynthetic fabric, as will be described in more detail below. The first sleeve 16 is constructed by folding an upper first edge portion 22 of the sheet of geosynthetic fabric along a lengthwise fold line and securing the first edge portion toward a lengthwise edge 24 thereof to the main sheet portion 20. The flotation unit 12, which may comprise one or more blocks of buoyant material, can then be inserted, when desired, into vertical slits 13 cut in the first sleeve 16 at predetermined intervals. Alternatively, the first edge portion 22 of the curtain 14 can be folded around the flotation unit 12 and then secured to the main sheet portion 20, forming the first sleeve 16 with the flotation unit 12 therein. If an inflatable flotation unit is used, the first sleeve 16 may additionally be provided with inlets/outlets (not shown) for valves (not shown) used to inflate and deflate the flotation unit.

The second sleeve 18 is constructed by folding a lower second edge portion 26 of the sheet of geosynthetic fabric along a lengthwise fold line and securing the second edge portion toward a lengthwise edge 28 thereof to the main sheet portion 20. A ballast 30 is positioned in the second sleeve 18. The second edge portion 26 of the curtain 14 can be folded around the ballast 30 and then secured to the main sheet portion 20, forming the second sleeve 18 with the ballast 30 therein. Typically, the ballast 30 is a continuous length of chain or cable of sufficient weight to hold the main sheet portion 20 of the curtain 14 in a substantially vertical orientation below the flotation unit 12.

Ballasts such as lengths of steel chain (from less than $\frac{1}{4}$ inch to over $\frac{3}{4}$ inch) and steel cable (from less than $\frac{3}{4}$ inch to over $1\frac{1}{2}$ inches in diameter) have been used. Of course, chains and cables of greater or less diameter may be used to meet the specific requirements of a project design.

Figure 6:
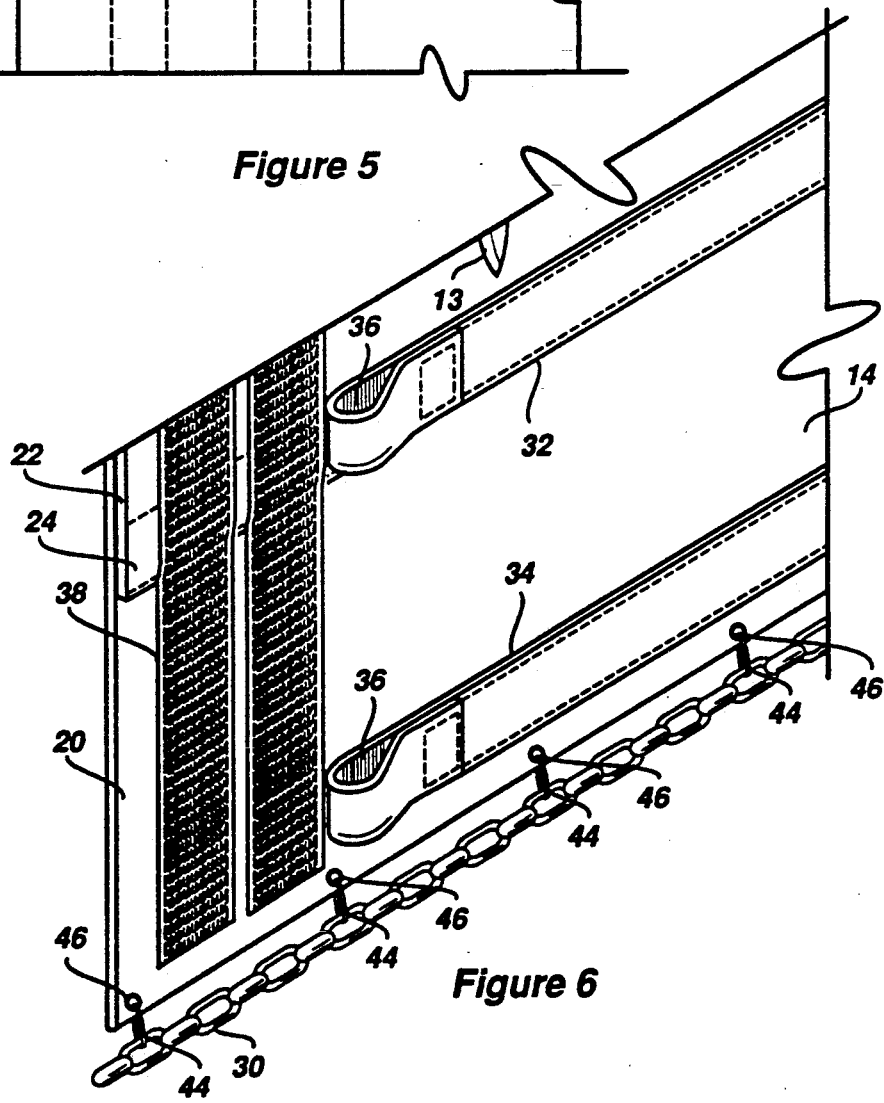
FIG. 6 is a fragmentary, front elevational view of the boom of the invention.

It is not always necessary to form the second sleeve 18 to contain ballast. Ballast chains, cable, or weighted cable can be tied with wire to the curtain 14 at its bottom or secured to the curtain by other means. For example, as shown in FIG. 6, the ballast 30 is attached to the lower edge portion of the curtain with wires 44 through holes or grommets 46 or the like.

In adverse wave and current conditions, the ballast 30 alone may not be sufficient to maintain the containment boom 10 in place or the curtain 14 in a substantially vertical orientation. It would therefore be desirable to employ an anchor or a series of anchors (not shown) to secure the boom in place. The anchors can be attached to the bottom of the curtain 14 or to the ballast 30. For booms of considerable length, anchors preferably are attached at regular intervals. Anchor location may be marked by brightly colored buoys, as necessary.

The containment boom 10 of the invention has at least two tow cords 32 and 34 secured to the main sheet portion 20. The tow cords 32 and 34 are used to tow the boom into position around a spill or to tow a boom from one location to another. The two cords 32 and 34 are bands or strips of nylon lifting straps, steel or aluminum cable, polypropylene rope, geosynthetic material, or the like that extend the length of the curtain 14 and are secured to the main sheet portion 20. The tow cord 32 is secured at the first sleeve 16 or therebelow and the tow cord 34 is secured at the second sleeve 18 or thereabove. The tow cords 32 and 34 have a loop portion 36 at each end.

Depending on the overall length of the curtain 14 and other design parameters, additional tow cords may be positioned on the main sheet portion as necessary.

The vertical dimension of the curtain 14 can be increased by securing additional sheets of geosynthetic fabric together along their coextending edges until the desired height is obtained.

Sewing or heat fusion of the geosynthetic material can be used to form the first and second sleeves 16 and 18, to connect multiple sheets together to add additional height, or to attach the tow cords 32 and 34. The geosynthetic fabric can be sewn with a conventional industrial sewing machine, and heat fusion can be accomplished with an industrial iron. Heat fusion can also be accomplished by puncturing or piercing through the overlapped geosynthetic fabric with a soldering iron. Good, strong connections have been made this way.

Figures 2, 3:
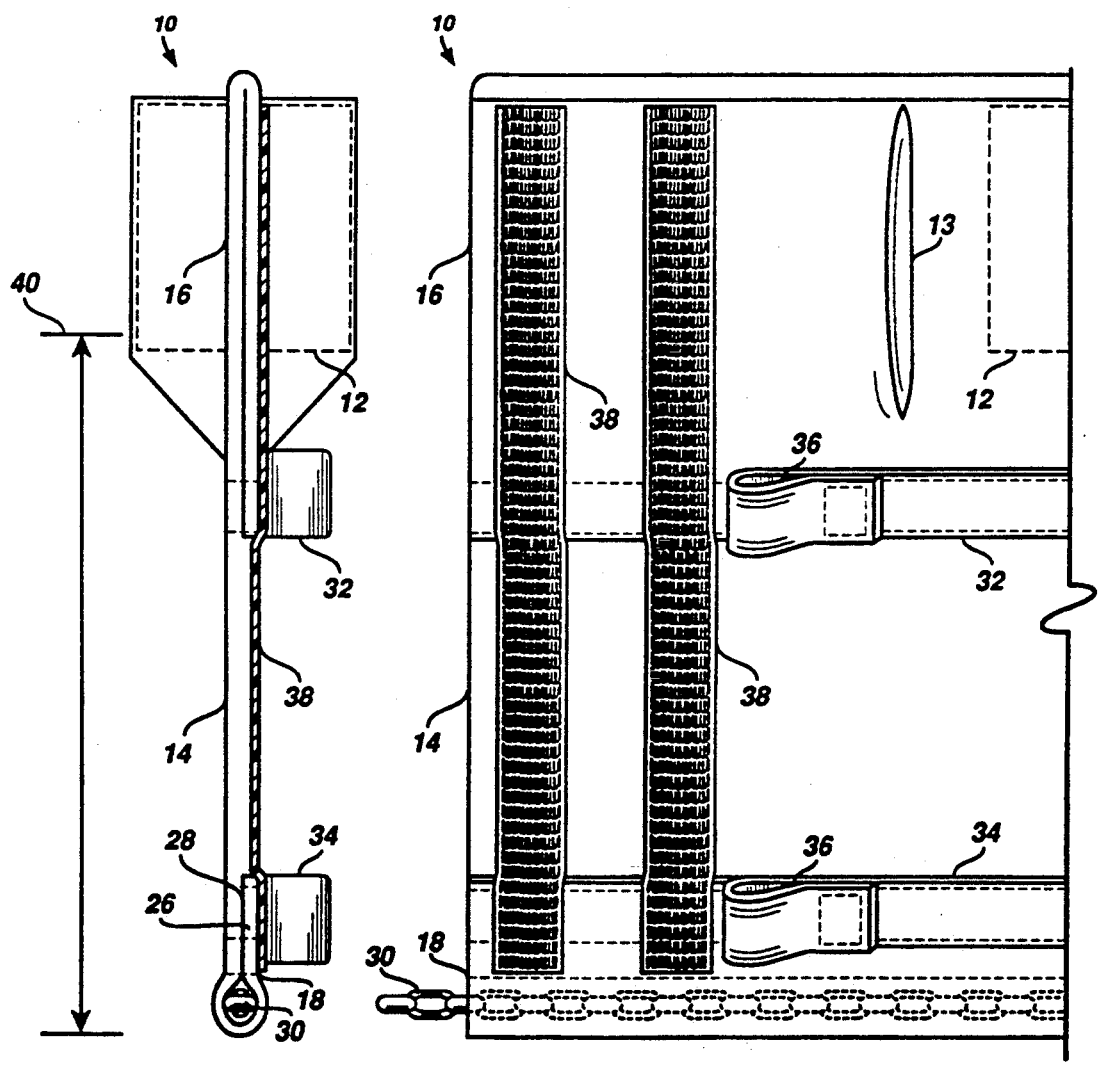
FIG. 2 is a cross-sectional view of the boom.
FIG. 3 is a fragmentary, front elevational view of the boom of the invention.
Figure 4:
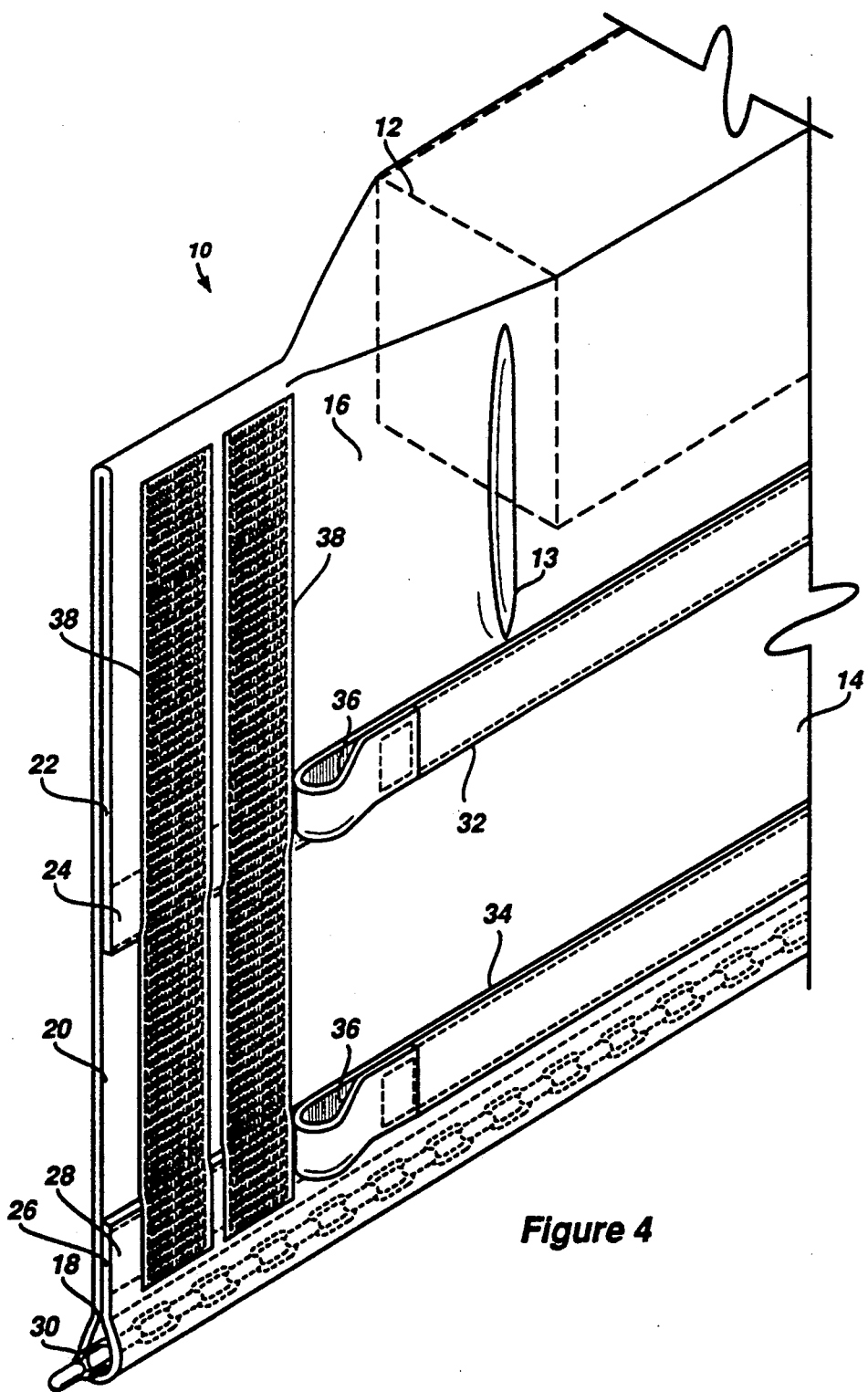
FIG. 4 is a fragmentary perspective view of one segment of the boom.
Figure 5:
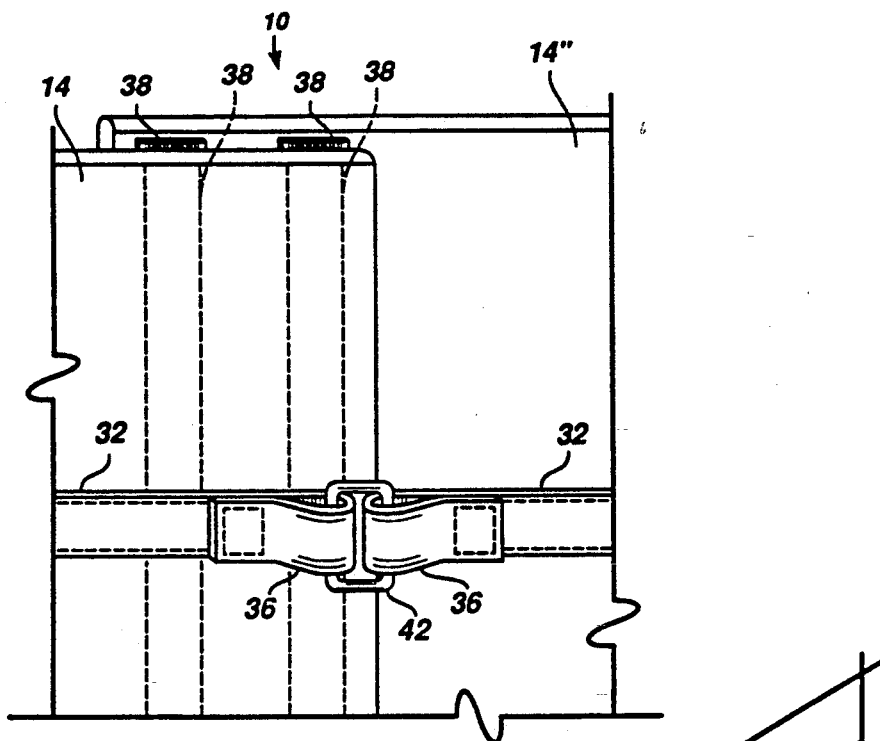
FIG. 5 is an enlarged view of a coupling used to connect two boom segments of the invention.

A series of containment booms 14 constructed according to the present invention can be joined together to form booms of longer longitudinal length. For this purpose, the curtain 14 extends longitudinally beyond the end of the flotation unit 12 to define an end portion 36 at each end of the containment boom 10, as best illustrated in FIGS. 1 and 4. With this construction, two curtains can be positioned such that the end portions 36 of two endwise adjacent curtains 14 overlap. The overlapping end portions 36 can be sewn or heat sealed together. For quicker on-site connections, a coupler device may be used. A particularly suitable coupler device, illustrated in FIGS. 3 and 4, is a pair of industrial hook-and-loop fastening strips 38, such as the Dual-Lock Systems (polyolefin) commercially available from the Minnesota, Mining and Manufacturing Company. Mating hook-and-loop fastening strips 38 are secured to the end portions 36 of the two endwise adjacent curtains 14 that are to be connected together, with the strips of one curtain positioned to coincide with mating strips of the other curtain. Other alternative mechanical means can be used to form the connection. The final step in joining the curtains 14 is to bring the tow cords 36 of one curtain together with the tow cords of the other curtain and secure the tow cords together using carabiners 42, shackles, or other appropriate mechanical connecting means, such as shown in FIG. 5. Such a connection allows for uniform load distribution along the tow cords. If desired, the ballast 30 can be tied to the lower tow cord 34 rather than being positioned in the second sleeve 18.

FIG. 5 depicts a portion of one curtain 14' connected to another curtain 14" to form a longer containment boom 10.

A significant aspect of the present invention is the use of a geosynthetic fabric, such as a geotextile material, or filter fabric for the curtain 14. The geosynthetic fabric is "hydrophobic" or "water-pervious," meaning that water passes through the fabric. The hydrophobic property of geosynthetic fabric permits the passage of water current through the main body portion 20 of the curtain 14, thereby maintaining the relative shape and position of the boom even in adverse current conditions, and also facilitating towing.

Typically, the geosynthetic fabric will be "oleophilic," meaning that it absorbs or attracts oil, thereby blocking the flow of oil. For containment of silt and other suspended particulates, it is not essential that the curtain be oleophilic; obviously, for containment of oil, the curtain preferably is oleophilic. Useful geosynthetic fabrics are further characterized by high load distribution capacity, the ability to abate material filtration, and permeability to water. Geosynthetic fabrics are commercially available in a range of tensile strengths, permeabilities, and permitivities, and are useful for the purposes of the invention throughout those ranges.

Surprisingly, it has been discovered that geosynthetic fabrics have some ability to filter or trap bacteria. This is a particularly desirable property for applications involving isolation of beaches and bodies of water used for human purposes. Medical and human wastes carry with them a very real potential for bacterial infection. In addition to physically trapping waste, the curtain of the invention can serve to reduce human exposure to bacteria transported into a swim area or beach.

Depending upon the environmental, tidal, wave and current conditions, anticipated load requirements, and other parameters, the appropriate geosynthetic fabric, tow cord, ballast, and flotation unit can be selected to meet the specific design requirements for a given spill event or other inclusion/exclusion project.

Other relevant parameters for the containment boom 10 include, but are not limited to, water depth, particulate size, length of time the boom is to be in place, pollutant composition, and the availability of manpower and equipment.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AmoPave® 4399, AmoPave® HD 4597, 4545, 4553, and 4561 (all polypropylene fabrics commercially available from Amoco Fabrics and Fibers Company); Typar®, a polypropylene fabric commercially available from Dupont; Trevira® Spunbond, a polyester fabric commercially available from Hoechst Fibers Industries. Examples of suitable woven geosynthetic fabrics include, but are not limited to, 1380 Silt Stop®, 1198, 1199, 2090, 2000, 2006 (all polypropylene fabrics commercially available from Amoco Fabrics and Fibers Company).

One of ordinary skill in the art would be able to select appropriate geosynthetic fabrics to meet project-specific design requirements without undue experimentation.

The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

For most applications, it is sufficient to construct the curtain 14 with a single layer of geosynthetic fabric. However, for some applications, a multilayer construction may be desirable to provide added strength or protection against abrasion. The layers could be of the same geosynthetic fabric or different fabrics. For instance, a curtain might have a first layer of nonwoven fabric and a second layer of a woven fabric, which would tend to be more abrasive-resistant than the nonwoven fabric.

In adverse wave and weather conditions, the flotation unit 12 must be selected to provide sufficient buoyancy to keep the containment boom 10 afloat and to maintain freeboard. Conventional flotation units usable with the present invention include inflatable devices, air bags, and floats made from buoyant materials, such as cork, synthetic foams, and other plastics. However, conventional devices may not perform adequately under adverse conditions.

It has been found that under adverse conditions, expanded polystyrene ("EPS") is especially suitable for use as the flotation unit 12. It is desirable to coat or seal the EPS to prevent deterioration associated with prolonged exposure to the elements. EPS is commercially available from ARCO Chemical Company as Dylite ® and can be formed or molded into flotation units of various sizes and shapes (e.g., cylindrical, square, etc.) as required by project design. The EPS has a positive buoyancy that keeps the flotation unit 12 above the water surface at all times, allowing the flotation unit to ride the waves, even in adverse conditions. An EPS flotation unit is not deformed by wave action and does not lose buoyancy if punctured, as would an inflatable device. A single cubic foot of EPS can support as much as 60 lbs. A commonly used size of flotation unit of EPS is 12"×12"×8', but the size can be readily adapted to meet specific wave and environmental conditions and depth requirements.

As noted, the boom 10 of the invention is capable of various uses in addition to containment of spills and releases. The boom could be used as a beach seine device. A boom according to the invention could be deployed and attached to a large or small vessel that would tow the boom through a body of water or a section thereof to intercept and collect floating debris, suspended particulates, and the like.

The invention is also useful as a littoral flow trap or basin. The ongoing tide and flow of oceans and rivers cause erosion and deterioration of shoreline, beaches, and river banks. By trapping sand and particulates held in suspension and by controlling the flow and impact pressures on beaches and river banks, the suspended sand, soil, and particulates will settle out of suspension, allowing for buildup of beaches and shorelines. The boom 10 of the invention can therefore be used to prevent the deterioration of beaches and shorelines. It can also be used to build up or rebuild the shorelines and river banks. Littoral flow runs parallel to the shoreline, thus requiring the boom to be positioned so as to intercept the water flow. The boom could be floated on the water surface 40, as depicted in FIG. 2, or submerged to allow for vessel traffic. Since the geosynthetic fabric is water permeable, it acts as a filter, trapping the suspended particulates while allowing the natural water flow to pass uninhibited.

The boom 10 can also be used as a bathing beach pollution and debris barrier screen to define a swim area. The boom, according to the invention, would be positioned and anchored to isolate an area of water. The geosynthetic fabric used for the boom curtain allows water to flow into and out of the swim area, so the water is continuously recharged and does not stagnate. The barrier isolates the beach and swim area from debris and contaminants, such as medical waste that might be released by sources such as combined sewage outfall (CSO) and be carried into the vicinity of the swim area by the flow of water.

The foregoing description of the invention is intended to be merely explanatory thereof. Various modifications can be made to the method and apparatus described herein without departing from the scope of the invention.

I claim:

1. A boom curtain comprised of at least one sheet of a flexible geosynthetic fabric, having an upper edge, a lower edge, and a main sheet portion therebetween, and at least two tow cords secured to the main sheet portion, said upper edge being folded along a lengthwise fold line and secured to the main sheet portion to form a first sleeve to contain a flotation unit, and said lower edge being folded lengthwise around a ballast and secured to the main sheet portion to form a second sleeve, said first sleeve additionally including slits cut therein at regular intervals for insertion of floatation units.

2. A boom curtain according to claim 1 having flotation units inserted into the first sleeve.

* * * * *